United States Patent
Zhou et al.

(10) Patent No.: US 11,036,405 B2
(45) Date of Patent: Jun. 15, 2021

(54) RUNTIME INFORMATION TRANSFER BETWEEN KERNEL MODULES

(71) Applicant: VMware, Inc., Palo Alto, CA (US)

(72) Inventors: Jingmin Zhou, Palo Alto, CA (US); Subrahmanyam Manuguri, Palo Alto, CA (US); Anirban Sengupta, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/124,208

(22) Filed: Sep. 7, 2018

(65) Prior Publication Data

US 2020/0081638 A1  Mar. 12, 2020

(51) Int. Cl.
*G06F 3/06* (2006.01)
*G06F 9/455* (2018.01)

(52) U.S. Cl.
CPC .......... *G06F 3/0631* (2013.01); *G06F 3/0604* (2013.01); *G06F 3/0644* (2013.01); *G06F 3/0673* (2013.01); *G06F 9/45558* (2013.01)

(58) Field of Classification Search
CPC .................................................. G06F 3/0631
USPC ....................................................... 711/153
See application file for complete search history.

(56) References Cited

U.S. PATENT DOCUMENTS

| | | | |
|---|---|---|---|
| 2012/0254531 A1* | 10/2012 | Urata | G06F 12/0871 711/113 |
| 2014/0089918 A1* | 3/2014 | Levon | G06F 9/45545 718/1 |
| 2016/0028658 A1* | 1/2016 | Lambeth | H04L 29/12839 718/1 |

* cited by examiner

*Primary Examiner* — Jae U Yu
(74) *Attorney, Agent, or Firm* — SU IP Consulting (57) ABSTRACT

Example methods and systems are provided for a computer system to transfer runtime information between a first kernel module and a second kernel module. In one example, the method may comprise assigning ownership of a memory pool to the first kernel module; and the first kernel module accessing the memory pool to store runtime information associated with one or more operations performed by the first kernel module. The method may also comprise releasing ownership of the memory pool from the first kernel module while maintaining the runtime information in the memory pool; and assigning ownership of the memory pool to the second kernel module. The second kernel module may then access the memory pool to obtain the runtime information stored by the first kernel module.

21 Claims, 6 Drawing Sheets

Computer System
(e.g., Host-A 110A)

Assign ownership of memory pool to
first kernel module
210

Access, by first kernel module, memory
pool to store runtime information
220

Release ownership of memory pool from
first kernel module
230

Assign ownership of memory pool to
second kernel module
240

Access, by second kernel module, memory
pool to obtain runtime information
250

RUNTIME INFORMATION TRANSFER BETWEEN KERNEL MODULES

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc. In practice, a host may implement module(s) that store runtime information in memory to perform various operation(s). For example, a module implementing a network firewall may store runtime information in the form of firewall rules, etc. However, the module is unloaded (e.g., during an upgrade), the runtime information may be lost, which may adversely affect performance.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to runtime information will now be explained in more detail using FIG. 1, which is a schematic diagram illustrating example virtualized computing environment 100 in which runtime information transfer between kernel modules may be performed. It should be understood that, depending on the desired implementation, virtualized computing environment 100 may include additional and/or alternative component(s) than that shown in FIG. 1.

Figure 1:
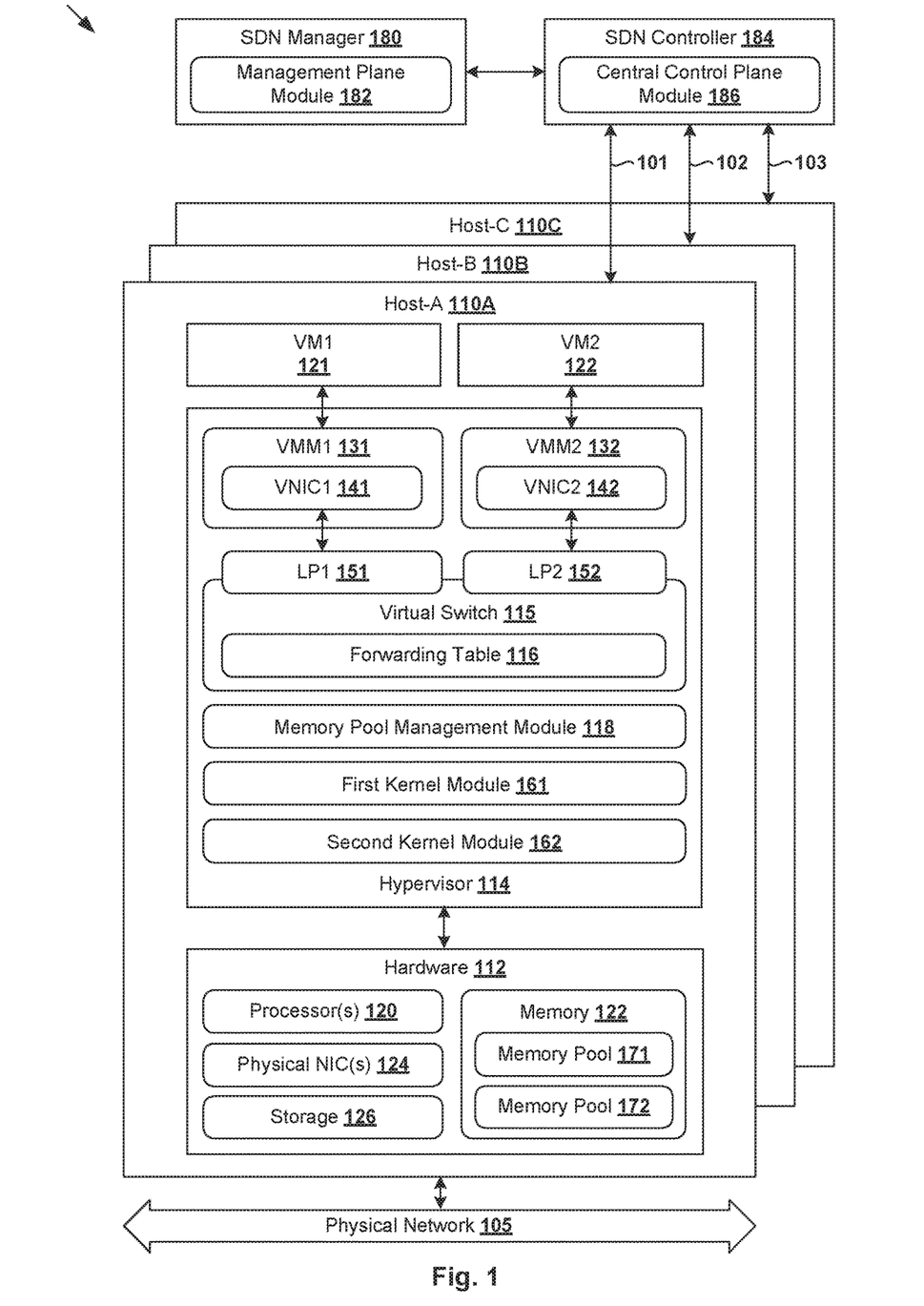
FIG. 1 is a schematic diagram illustrating an example virtualized computing environment in which runtime information transfer between kernel modules may be performed.

In the example in FIG. 1, virtualized computing environment 100 includes multiple hosts, such as host-A 110A, host-B 110B and host-C 110C that are inter-connected via physical network 102. Each host 110A/110B/110C includes suitable hardware and virtualization software (e.g., hypervisor) to support various virtual machines (VMs). Using host-A 110A as an example, hardware 112 and hypervisor 114 may be used to support VM1 121 and VM2 122. In practice, virtualized computing environment 100 may include any number of hosts (also known as "computer systems," "host computers," "host devices," "physical servers," "server systems," "transport nodes," etc.), where each host may be supporting tens or hundreds of VMs. Hypervisor 114 may implement any suitable virtualization technology, such as VMware ESX® or ESXi™ (available from VMware, Inc.), Kernel-based Virtual Machine (KVM), etc.

Although examples of the present disclosure refer to VMs, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc.

Hypervisor 114 maintains a mapping between underlying hardware 112 and virtual resources allocated to VMs 121-122. Hardware 112 includes suitable physical components, such as processor(s) 120, memory 122 (e.g., random access memory), storage disk(s) 126 (e.g., solid state drive, hard disk drive), multiple physical network interface controllers (PNICs) 124, etc. Virtual resources are allocated to VM 121/122 to support a guest operating system (OS) and application(s), etc. Corresponding to hardware 112, the virtual resources (not all shown for simplicity) allocated to VM 121/122 may include virtual CPU, guest physical memory, virtual disk, virtual network interface controller (VNIC) 141/142, etc. Virtual machine monitors (VMMs) 131-132 are implemented by hypervisor 114 are to emulate hardware resources. For example, VMM1 131 is configured to emulate VNIC 141 to provide network access for VM1 121, while VMM2 132 to emulate VNIC 141 for VM2 122. In practice, VMM 131/132 may be considered as components that are part of, or separated from, VM 121/122.

Hypervisor 114 further implements virtual switch 115 and a logical distributed router (DR) instance (not shown for simplicity) to handle egress packets from, and ingress packets to, corresponding VMs 121-122. Packets may be received from, or sent to, each VM 121/122 via associated logical port 151/152. The term "packet" may refer generally to a group of bits that can be transported together, and may be in another form, such as "frame," "message," "segment," etc. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

As used herein, the term "logical port" may refer generally to a port on a logical switch to which a virtualized computing instance is connected. A "logical switch" may refer generally to Software-Defined Networking (SDN) construct that is collectively implemented by virtual switches at respective hosts 110A-C in the example in FIG. 1, whereas a "virtual switch" may refer generally to a software switch or software implementation of a physical switch. In practice, there is usually a one-to-one mapping between a logical port on a logical switch and a virtual port on a virtual switch. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Through SDN, benefits similar to server virtualization may be derived for networking services. For example, logical overlay networks may be provided that are decoupled from the underlying physical network infrastructure, and therefore may be provisioned, changed, stored, deleted and restored programmatically without having to reconfigure the underlying physical hardware. VMs may be connected via logical switches and logical distributed routers, which are implemented in a distributed manner and can span multiple hosts to connect VMs on different hosts 110A-C. For example, logical switches that provide logical layer-2 connectivity may be implemented collectively by virtual switches at respective hosts 110A-C, and represented internally using forwarding tables at respective virtual switches. Forwarding tables (e.g., 116 at host-A 110A) may each include entries that collectively implement the respective logical switches. Further, logical distributed routers that provide logical layer-3 connectivity may be implemented collectively by distributed router (DR) instances and represented internally using routing tables (not shown for simplicity) at respective DR instances. Routing tables may each include entries that collectively implement the respective logical distributed routers.

SDN manager 180 and SDN controller 184 are example network management entities that facilitate implementation of logical networks in SDN environment 100. One example of an SDN controller is the NSX controller component of VMware NSX® (available from VMware, Inc.) that may be a member of a controller cluster (not shown) and configurable using SDN manager 180. One example of an SDN manager is the NSX manager component that provides an interface for end users to perform any suitable configuration in SDN environment 100. SDN controller 184 and SDN manager 180 support central control plane module 186 and management plane module 182, respectively. SDN controller 184 may interact (e.g., send configuration information) to host 110A/110B/110C via control-plane channel 101/102/103. Management entity 180/184 may be implemented using physical machine(s), virtual machine(s), a combination thereof, etc.

In practice, hosts 110A-C may each implement module(s) to perform various operations, such as network firewall operations, etc. For example in FIG. 1, a network firewall may be deployed as first kernel module 161 to protect host-A 110A against security threats caused by unwanted packets. First kernel module 161 may be configured to filter ingress packets to, and/or egress packets from, VMs 121-122 based on any suitable user-defined security policies and firewall rules. In practice, first kernel module 161 may be a functional module in an OS kernel implemented by hypervisor 114. Depending on the desired implementation, network packets may be filtered according to firewall rules at any point along a datapath from the VMs 121-122 to physical NIC(s) 124. In one embodiment, a filter component (not shown) may be incorporated into VNIC 141/142 that enforces firewall rules configured for corresponding VM 121/122.

To improve the efficiency of packet filtering, first kernel module 161 may generate and store runtime information, such as security policies, firewall rules, network flow state information, etc. Such runtime information is generally stored in memory pool 171/172 in memory 122. However, when there is a need to upgrade the network firewall from first kernel module 161 to second kernel module 162, the runtime information will be released or removed before first kernel module 161 is unloaded or uninstalled from hypervisor 114. In this case, network performance may be adversely affected because of long delay or permanent disruption during and after the upgrade.

Conventionally, one approach to maintain the runtime information is to extract the runtime information before first kernel module 161 is unloaded, such as by reading the runtime information from memory 122 and saving it into a file. This way, once second kernel module 162 is loaded, the runtime information may be restored by reading the runtime information from the file and writing it to memory 122, etc. However, although the runtime information is maintained, extracting and restoring operations (e.g., read operations from kernel, write operations to kernel) may be prone to errors, time consuming and resource intensive. This may lead to undesirable impact on performance, and network security in the case of firewall implementation.

Runtime Information Transfer

According to examples of the present disclosure, runtime information transfer between kernel modules may be implemented in an improved manner. Instead of necessitating expensive extracting and restoring operations, the ownership of a memory pool storing the runtime information may be transferred from one module (e.g., first kernel module 161) to another module (e.g., second kernel module 162). As such, unlike the conventional approaches, the runtime information may be maintained in the memory pool to reduce or avoid the likelihood of network traffic disruption and errors caused by extracting and restoring operations.

Throughout the present disclosure, the term "kernel module" (also known as a "kernel-space module") may refer to any suitable operation(s), function(s), process(es), or the like, that are implemented using an OS kernel of a computer system. In general, modern operating systems have two execution privileges—kernel space and user space. Compared to user-space modules, kernel modules generally have higher execution privilege and substantially the same view of the memory address space. In practice, a kernel module may be loaded into, and unloaded from, a kernel (e.g., implemented by hypervisor 114 or guest OS of VM 121/122) to extend the functionality of the kernel. The term "memory pool" (also known as a "memory heap") may refer generally to memory block(s) of any suitable size. Depending on the desired implementation, a memory pool may represent logical object(s) within physical memory (e.g., host physical memory 122), guest physical memory or guest virtual memory mapped to the physical memory, etc.

Figure 2:
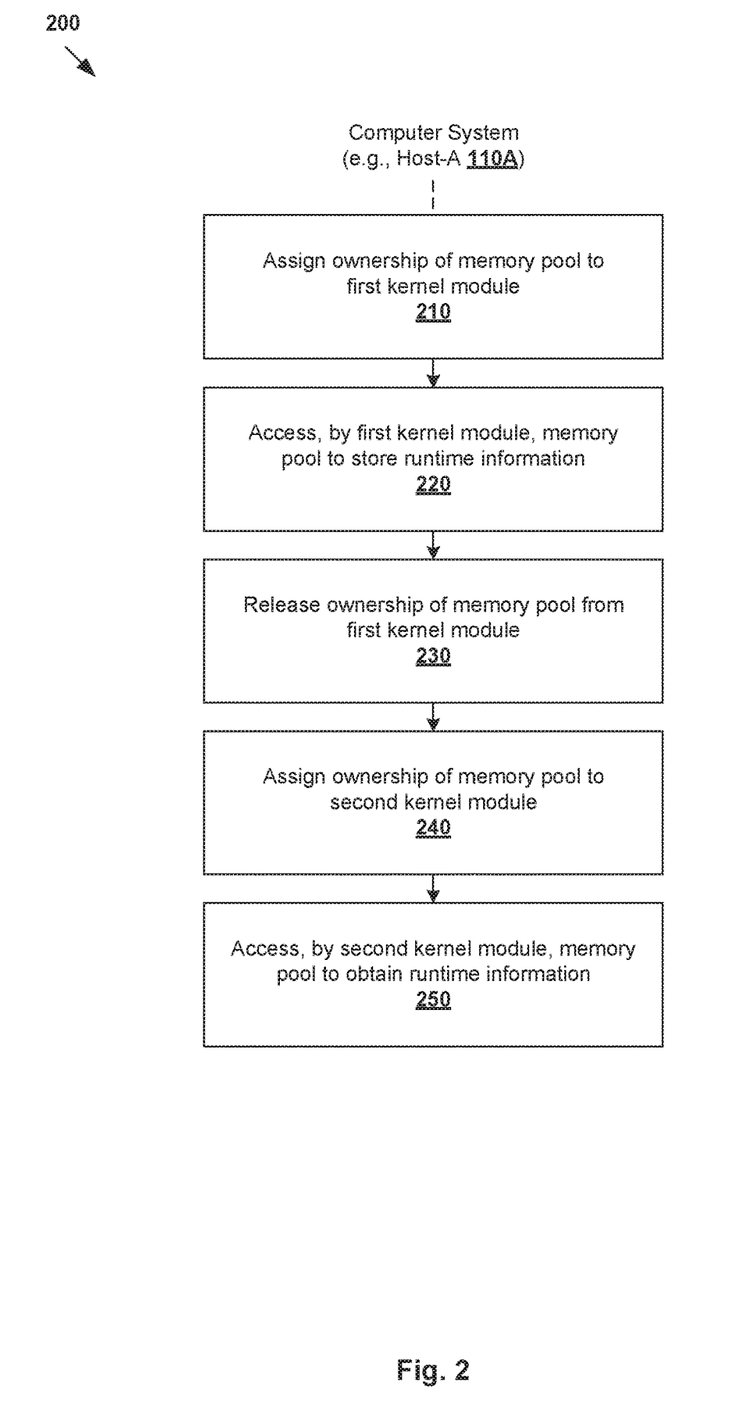
FIG. 2 is a flowchart of an example process for a computer system to transfer runtime information between kernel modules.

In more detail, FIG. 2 is a flowchart of example process 200 for a computer system (e.g., host-A 110A) to transfer runtime information between kernel modules. Example process 200 may include one or more operations, functions, or actions illustrated by one or more blocks, such as 210 to 250. The various blocks may be combined into fewer blocks, divided into additional blocks, and/or eliminated depending on the desired implementation. Examples of the present disclosure may be implemented by any suitable computer system such as host 110A/110B/110C, and more particularly using a memory pool management module (e.g., 118). In the following, various examples will be explained using host-A 110A as an example "computer system," first kernel module 161 as example "first module," second kernel module 162 as example "second module," and memory pool 171/172 in memory 122 as example "memory pool."

At 210 in FIG. 2, host-A 110A may assign ownership of memory pool 171/172 to first kernel module 161 implemented by host-A 110A. At 220, first kernel module 161 may access memory pool 171/172 to store runtime information associated with one or more operations performed by first kernel module 161. At 230, host-A 110A may release ownership of memory pool 171/172 from first kernel module 161 while maintaining the runtime information memory pool 171/172. At 240, the ownership of the memory pool may be assigned to second kernel module 162 implemented by host-A 110A. This way, at 250, second kernel module 162 may access memory pool 171/172 to obtain the runtime information stored by first kernel module 161.

Examples of the present disclosure may be performed to facilitate transfer of runtime information between kernel modules of different versions, such as when a first version implemented by first kernel module 161 is upgraded to a newer, second version implemented by second kernel module 162. In the case of network firewall implementation, first kernel module 161 may store runtime information that includes security policies, firewall rules, network flow state information, any combination thereof, etc. Throughout the present disclosure, the term "runtime information" may refer generally to any suitable information required by a module to perform various operation(s) during runtime (i.e., when the module is running or executing). In practice, it should be understood that examples of the present disclosure may be applicable in various scenarios and not limited to kernel module upgrades.

As will be discussed further below, block 210 may include host-A 110A detecting, from first kernel module 161, a request to create memory pool 171/172 associated with a memory pool name and a pool size. In this case, host-A 110A may send, first kernel module 161, a response specifying a memory pool identifier (ID) to allow first kernel module 161 to access the memory pool. Block 230 may include host-A 110A storing the memory pool name and memory pool ID associated with memory pool 171/172. Block 240 may include sending a response specifying the memory pool ID in response to detecting a request to acquire ownership of memory pool 171/172 based on its memory pool name. Various examples will be discussed below using FIG. 3 to FIG. 6.

Runtime Information Transfer

Figure 3:
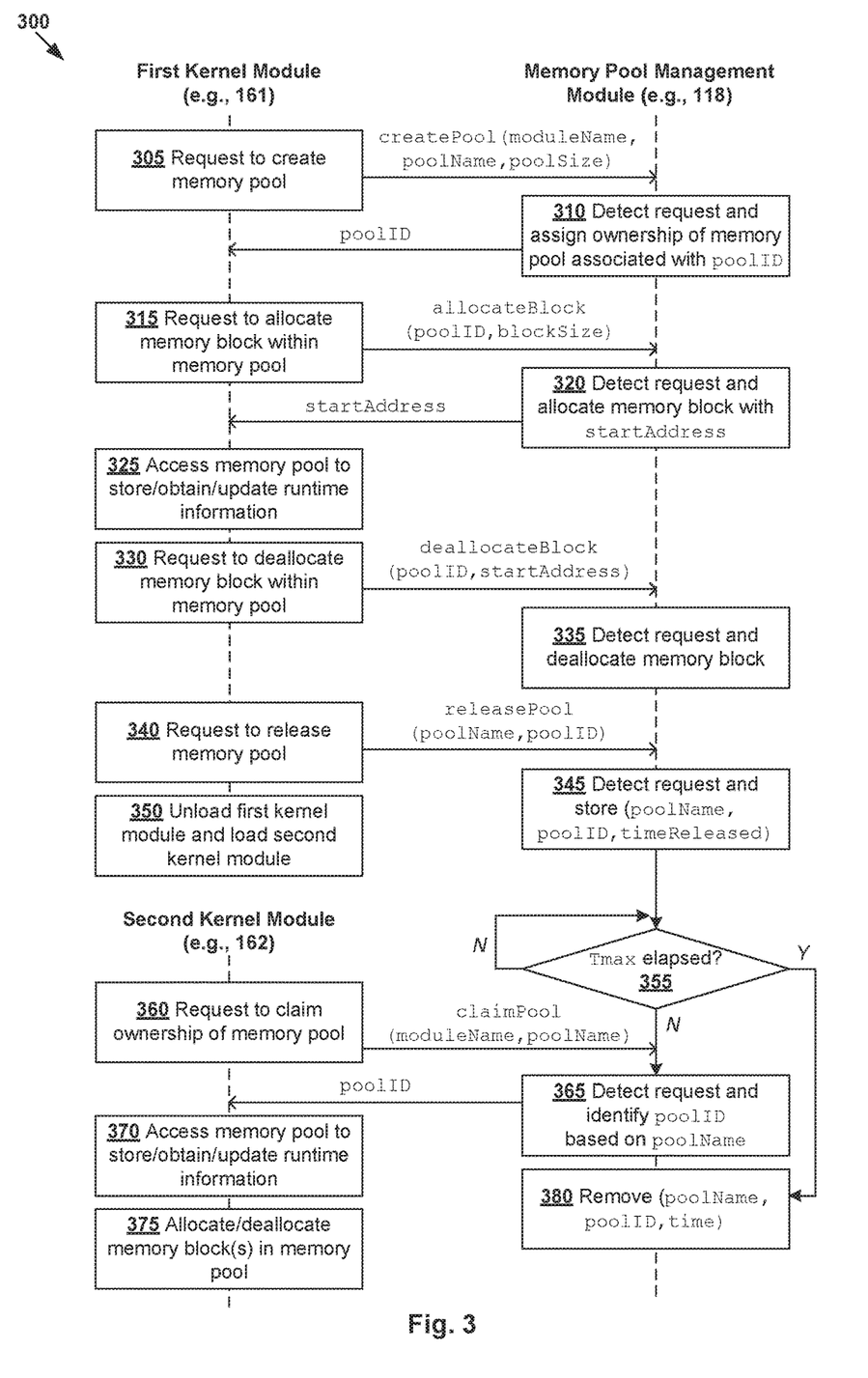
FIG. 3 is a flowchart of an example detailed process for a computer system to transfer runtime information between kernel modules.
Figure 4:
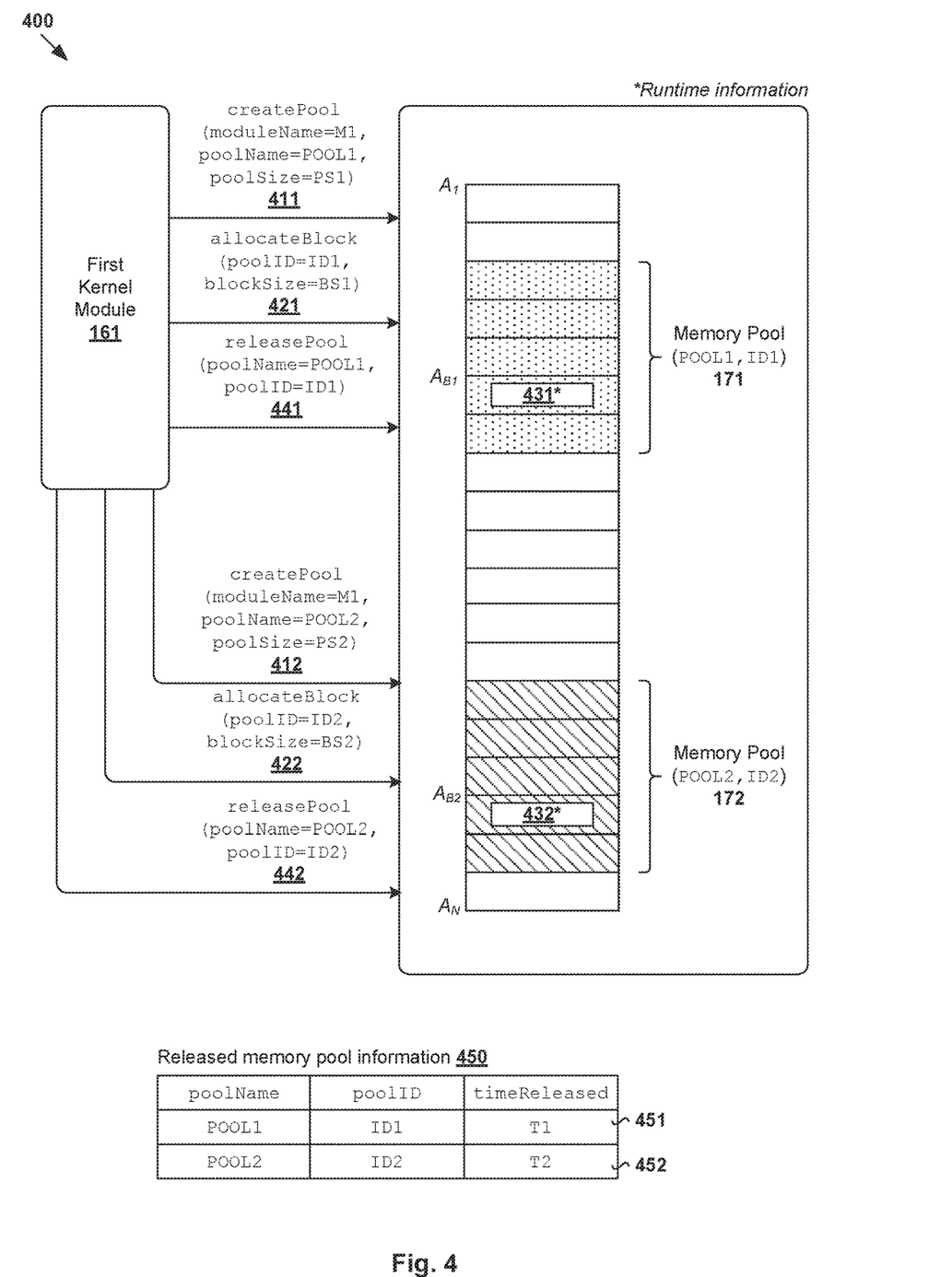
FIG. 4 is a schematic diagram illustrating an example of assigning ownership of a memory pool to a first kernel module.
Figure 5:
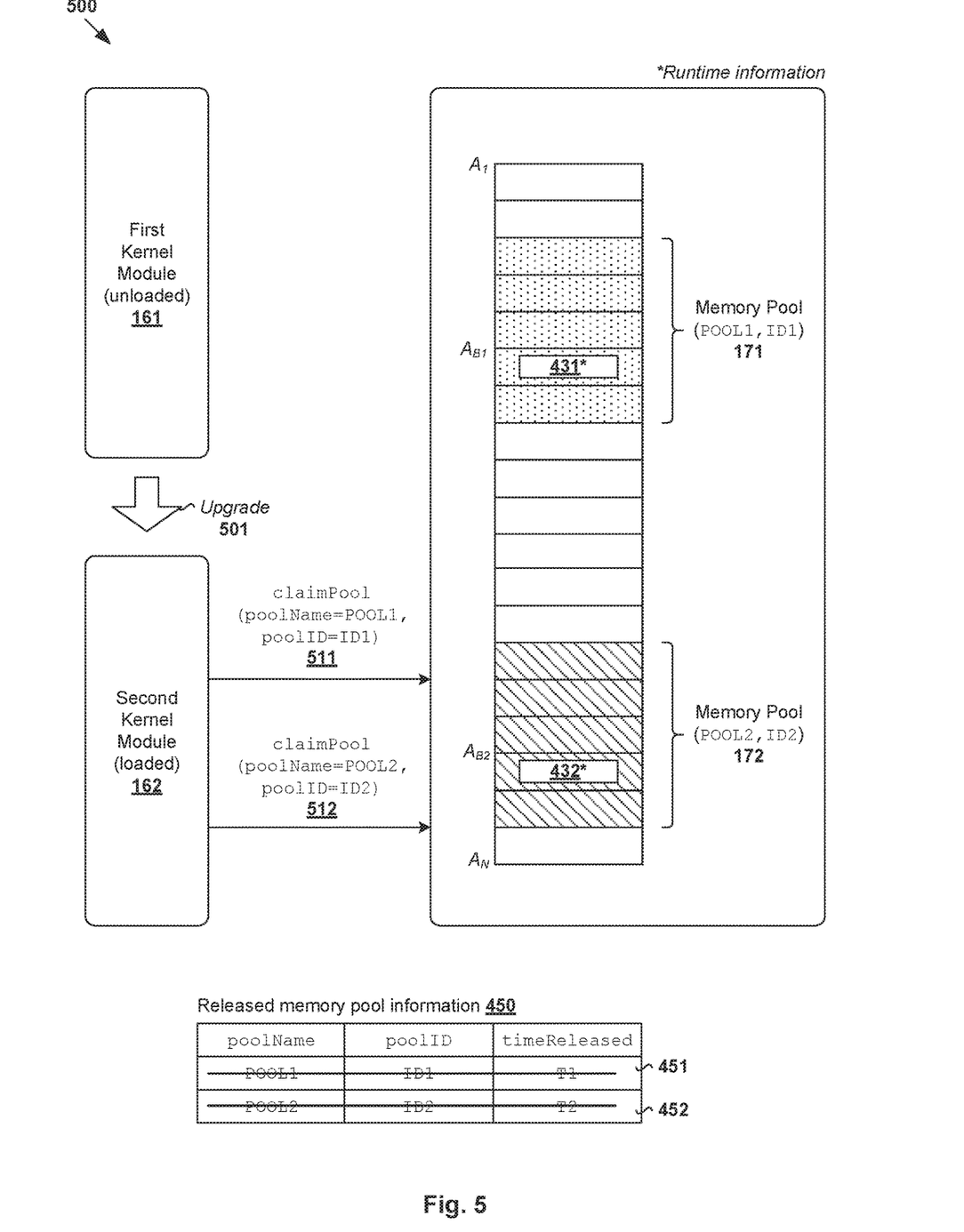
FIG. 5 is a schematic diagram illustrating an example of assigning ownership of a memory pool to a second kernel module.

FIG. 3 is a flowchart of example detailed process 300 for a computer system (e.g., host-A 110A) to transfer runtime information between kernel modules. Example process 300 may include one or more operations, functions, or actions illustrated by one or more blocks, such as 305 to 380. The various blocks may be combined into fewer blocks, divided into additional blocks, and/or eliminated depending on the desired implementation. Example process 300 may be implemented by host-A 110A using hypervisor 114 using any suitable component(s), such as memory pool management module 118, etc. The example in FIG. 3 will be explained using FIG. 4 and FIG. 5. FIG. 4 is a schematic diagram illustrating example 400 for assigning ownership of memory pool 171/172 to first kernel module 161. FIG. 5 is a schematic diagram illustrating example 500 of assigning ownership of memory pool 171/172 to second kernel module 162.

(a) Ownership by First Module

At 305 and 310 in FIG. 3, in response to detecting a request from first kernel module 161 to create a memory pool, host-A 110A assigns ownership of a new memory pool to first kernel module 161 and responds with a memory pool ID denoted as "poolID" associated with the memory pool. The request may be in any suitable form, such as an application programming interface (API) invocation, a notification or message, etc. In one example, memory pool management module 118 at hypervisor 114 may support a set of APIs for memory pool management (e.g., creation, release and removal), memory block management (e.g., allocation and deallocation), etc.

In the example in FIG. 4, first kernel module 161 may create multiple memory pools 171-172 by invoking create Pool(moduleName=M1, poolName=POOL1, poolSize=PS1) and create Pool(moduleName=M1, poolName=POOL2, poolSize=PS2), respectively. See corresponding 411-412 in FIG. 4. Parameter "moduleName" in createPool( ) may represent a name of first kernel module 161, while "poolName" and "poolSize" are the respective name and size (e.g., in bytes) of memory pool 171/172.

In response to detecting requests 411-412 from first kernel module 161, host-A 110A returns poolID=ID1 associated with first memory pool 171, and poolID=ID2 associated with second memory pool 172. Parameter "poolID" represents an ID that is assigned by hypervisor 114 (e.g., using memory pool management module 118) for first kernel module 161 to access memory pool 171/172, such as to allocate or deallocate memory block(s) within memory pool 171/172. Memory pools 171-172 may be within any suitable physical or virtual memory address space, such as $A_1$ to $A_N$ in FIG. 4. In practice, "poolName" (e.g., "POOL1") may be an internal name used by first kernel module 161 to refer to memory pool 171/172.

At 315 and 320 in FIG. 3, in response to detecting a request from first kernel module 161 to allocate a memory block within memory pool 171/172, host-A 110A responds with a start address of the allocated memory block for first kernel module 161 to access. For example, the request may be an API invocation of allocateBlock(poolID=ID1, blockSize=BS1) to allocate a memory block within first memory pool 171. In response, first kernel module 161 is provided with startAddress=$A_{B1}$ of the allocated memory block. See corresponding 421 in FIG. 4.

Parameter "blockSize" represents the size (e.g., in bytes) of a memory block to be allocated within memory pool 171/172, which means "blockSize" may be less than or equal to the associated "poolSize." In another example, first kernel module 161 may invoke allocateBlock(poolID=ID1, blockSize=BS2) to allocate another memory block within second memory pool 172. See corresponding 422 in FIG. 4.

In response, first kernel module 161 is provided with startAddress=$A_{B2}$ of allocated memory block. Additionally or alternatively, first kernel module 161 may be provided with a pointer to the allocated memory block within memory pool 171/172.

At 325 in FIG. 3, first kernel module 161 may access memory pool 171/172 to store any suitable runtime information (see 431/432 in FIG. 4). In the case of network firewall, first kernel module 161 may store any suitable runtime information relating to security policies, firewall rules, network interface ID of a container used by the firewall rules, network flow state information (e.g., five-tuple information of network flows), any combination thereof, etc. In practice, a firewall rule may be defined using five-tuple information: source network address, source port number (PN), destination network address, destination PN, and protocol, in addition to an action (e.g., allow or deny). The protocol tuple (also known as service) may be set to TCP, UDP, hypertext transfer protocol (HTTP), HTTP Secure (HTTPS), etc. During runtime, first kernel module 161 may access memory pool 171/172 to obtain or update the runtime information to filter packets at host-A 110A. Depending on the desired implementation, at 330 and 335 in FIG. 3, first kernel module 161 may request hypervisor 114 to free or deallocate memory block(s), such as by invoking deallocateBlock(poolID, startAddress), etc.

At 340 in FIG. 3, first kernel module 161 may send a request to release a particular memory pool without destroying the runtime information stored within the memory pool. In the example in FIG. 4, first kernel module 161 may invoke releasePool(poolName=POOL1, poolID=ID1) to release memory pool 171. Further, first kernel module 161 may invoke releasePool(poolName=POOL2, poolID=ID2) to release memory pool 172. See 441-442 in FIG. 4.

At 345 in FIG. 3, in response to detecting the request to release memory pools 171-172, at 345 in FIG. 3, host-A 110A may store information associated with released memory pools 171-172, such as (poolName=POOL1, poolID=ID1, timeReleased=T1) and (poolName=POOL2, poolID=ID2, timeReleased=T2), respectively. The "timeReleased" parameter (to be discussed further below) may record the time at which the memory pool is released. See entries 451-452 in released memory pool information table 450 in FIG. 4.

(b) Ownership by Second Module

At 350 in FIG. 3, upgrade operation(s) may be performed to, for example, unload or uninstall first kernel module 161 from an OS kernel associated with hypervisor 114, before loading or installing second kernel module 162 onto the OS kernel. As indicated at 501 in the example in FIG. 5, first kernel module 161 may implement one version (e.g., v1) of a firewall application that is upgraded to a newer version (e.g., v2) implemented by second kernel module 162. In practice, the upgrade operation(s) may be triggered programmatically (e.g., using upgrade software) to unload first kernel module 161 and load second kernel module 162. Additionally or alternatively, the upgrade operation(s) may be triggered by a user (e.g., network administrator) manually.

Host-A 110A may use the "timeReleased" parameter recorded at block 345 to manage released memory pools 171-172. Referring to FIG. 3 again, at 355 (yes) and 380, in response to determination that a predetermined period of time (e.g., Tmax) has elapsed since memory pool 171/172 has been released (e.g., timeCurrent−timeReleased>Tmax), memory pool 171/172 may be destroyed and corresponding (poolName, poolID, timeReleased) information removed from table 450. This way, host-A 110A may keep track, and where necessary destroy, memory pools that have been released but not re-claimed after the predetermined period of time.

Otherwise, at 360 and 365 in FIG. 3, in response to detecting a request to claim or acquire the ownership of memory pool 171/172 before the predetermined period of time (e.g., Tmax) has elapsed, host-A 110A may assign ownership of memory pool 171/172 to second kernel module 162. In the example in FIG. 5, second kernel module 162 may invoke claimPool(moduleName=M2, poolName=POOL1) to acquire the ownership of memory pool 171, and claimPool(moduleName=M2, poolName=POOL2) to acquire the ownership of memory pool 172. See corresponding 511-512 in FIG. 5. In this example, both kernel modules 161-162 generally use the same name for memory pool 171/172.

At 365 in FIG. 3, in response to detecting the request to claim the ownership of memory pool 171 based on poolName=POOL1, host-A 110A performs a lookup to identify corresponding poolID=ID1 associated with memory pool 171 from table 450. Further, in response to detecting the request to claim the ownership of memory pool 172 based on poolName=POOL2, host-A 110A performs a lookup to identify poolID=ID2 associated with memory pool 172 from table 450. Host-A 110A also responds with the corresponding poolID to allow second kernel module 162 to access memory pool 171/172 using the poolID. At 380 in FIG. 3, after transferring the ownership of memory pool 171/172, corresponding (poolName, poolID, timeReleased) information may be removed from table 450. See corresponding 451-452 in FIG. 5.

At 370 in FIG. 3, after being assigned with the ownership of memory pool 171/172, second kernel module 162 may access memory pool 171/172 to obtain runtime information 431/432 stored by first kernel module 161. Further, second kernel module 162 may access memory pool 171/172 to update runtime information 431/432, and store any additional and/or alternative runtime information during runtime. At 375 in FIG. 3, second kernel module 162 may perform any necessary memory block allocation and/or deallocation, which has been described using blocks 315-335 and will not be repeated here for brevity.

It should be understood that examples of the present disclosure may be implemented transfer any suitable runtime information. In another example, first kernel module 161 and second kernel module 162 may be network filesystem kernel modules. In this case, runtime information 431-432 in memory pool 171/172 in FIG. 4 and FIG. 5 may include information relating to connection(s) to network file server(s), directories and files, etc. Such runtime information 431-432 may be passed on from first kernel module 161 to second kernel module 162 so that second kernel module 162 does not have to re-establish a connection to the relevant network file server(s). Further, second kernel module 162 does not have to re-read directories and files from the network file server(s), thereby improving efficiently.

It should be understood that examples of the present disclosure may be implemented to transfer runtime information between any suitable modules. For example, the ownership of memory pool 171/172 may be further transferred from second kernel module 162 to a third kernel module, from the third kernel module to a fourth kernel module, and so on. Additional and/or alternative memory pool(s) may be created by second kernel module 162, and the ownership of which transferred to, other kernel module(s). This way, runtime information may be maintained in the memory pool(s) and transferred to different modules without necessitating any extracting and restoring operations.

Container Implementation

Figure 6:
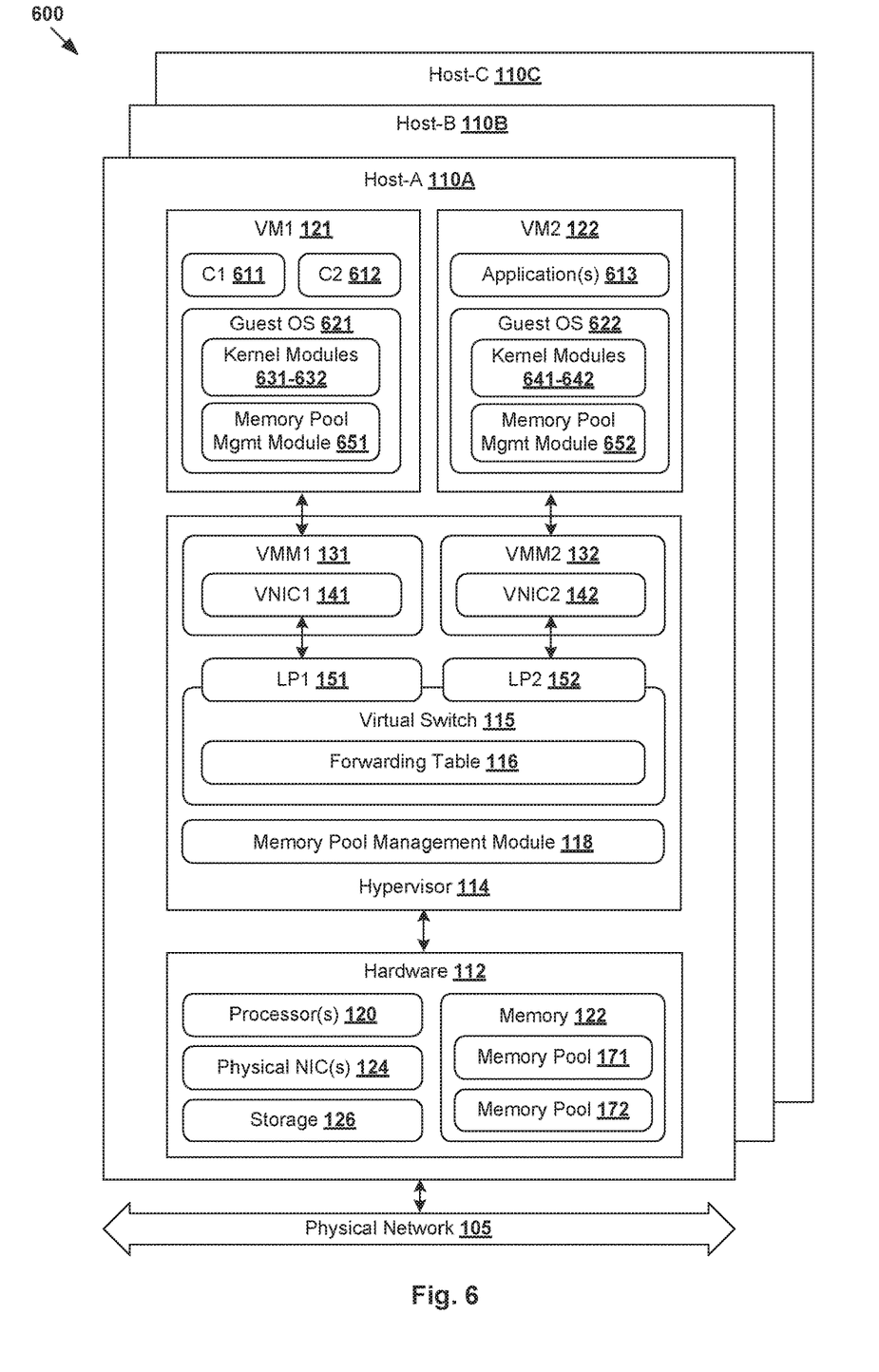
FIG. 6 is a schematic diagram illustrating an example virtualized computing environment with containers.

Although explained using VMs 121-122, it should be understood that SDN environment 100 may include other virtual workloads, such as containers, etc. For example, FIG. 6 is a schematic diagram illustrating example virtualized computing environment 600 with containers 611-612. As used herein, the term "container" (also known as "container instance") is used generally to describe an application that is encapsulated with all its dependencies (e.g., binaries, libraries, etc.).

In the example in FIG. 6, VM1 121 may support containers denoted as C1 611 and C2 622. Running containers 611-612 inside VM1 121 (known as "containers-on-virtual-machine" approach) not only leverages the benefits of container technologies but also that of virtualization technologies. Containers 611-612 may be executed as isolated processes inside VM1 121 and supported by guest OS 621. Containers 611-612 are "OS-less", meaning that they do not include any OS that could weigh 10 s of Gigabytes (GB). This makes containers 611-612 more lightweight, portable, efficient and suitable for delivery into an isolated OS environment. VM2 122 may support containers, or any suitable application(s) 613.

Although explained using modules (e.g., kernel modules 161-162) implemented by hypervisor 114, it should be understood that examples of the present disclosure may be implemented to transfer runtime information between kernel modules implemented by VM 121/122. In a first example in FIG. 6, runtime information may be transferred between first kernel module 631 and second kernel module 632 implemented by guest OS 621 running inside VM1 121. In this example, kernel modules 631-632 may be modules that are specific to guest OS 621 at VM1 121 (i.e., not hypervisor 114) and have substantially the same view of memory address space assigned to guest OS 621. Depending on the desired implementation, kernel modules 631-632 may send requests for releasing and acquiring ownership of memory pool(s) to memory pool management module 651 at VM1 121.

In a second example in FIG. 6, at VM2 122, runtime information may be transferred between third kernel modules 641 and fourth kernel module 642 implemented by guest OS 622. Similarly, kernel modules 641-642 may be modules that are specific to guest OS 622 at VM1 122 (i.e., not hypervisor 114) and have substantially the same view of memory address space assigned to guest OS 621. Depending on the desired implementation, kernel modules 641-642 may send requests for releasing and acquiring ownership of memory pool(s) to memory pool management module 652 at VM2 122.

Depending on the desired implementation, the "memory pool" assigned to kernel modules 631-632, 641-642 may include memory block(s) having an address within a guest virtual memory address space, which is mapped to guest physical memory address space maintained by guest OS 621/622. The guest physical memory address space may be mapped to host physical memory address space of memory 122, the mapping of which may be maintained by hypervisor 114 (e.g., using memory pool management module 118). In this case, runtime information discussed using FIG. 1 to FIG. 5 may include state information relating to VM 121/122, container 611/612, application 613, any combination thereof, etc.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 6. For example, a computer system capable of acting as host 110A/110B/110C may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a host to transfer runtime information between a first kernel module and a second kernel module, the method comprising:
   assigning ownership of a memory pool at the host to the first kernel module implemented by the host;
   accessing, by the first kernel module, the memory pool to store runtime information associated with one or more operations performed by the first kernel module;
   releasing ownership of the memory pool from the first kernel module while maintaining the runtime information in the memory pool;
   assigning ownership of the memory pool to the second kernel module implemented by the host; and
   accessing, by the second kernel module, the memory pool to obtain the runtime information stored by the first kernel module.

2. The method of claim 1, wherein releasing ownership of the memory pool comprises:
   in response to detecting, from the first kernel module, a request to release ownership of the memory pool, storing a memory pool name and a memory pool identifier associated with the memory pool.

3. The method of claim 2, wherein assigning ownership of the memory pool to the second kernel module comprises:
   detecting, from the second kernel module, a request to acquire ownership of the memory pool based on the memory pool name; and
   sending, to second kernel module, a response specifying the memory pool identifier to allow the second kernel module to access the memory pool.

4. The method of claim 2, wherein assigning ownership of the memory pool to the first kernel module comprises:
   detecting, from the first kernel module, a request to create the memory pool associated with the memory pool name and a pool size; and
   sending, to the first kernel module, a response specifying the memory pool identifier to allow the first kernel module to access the memory pool.

5. The method of claim 2, wherein releasing ownership of the memory pool comprises:
   in response to determination that a period of time has elapsed since a release time associated with the memory pool, removing the memory pool name and the memory pool identifier associated with the memory pool.

6. The method of claim 1, further comprising:
   prior to assigning ownership of the memory pool to the second kernel module, unloading the first kernel module from a kernel of the host, wherein the first kernel module implements a first version of one or more operations.

7. The method of claim 6, further comprising:
   prior to assigning ownership of the memory pool to the second kernel module, loading the second kernel module into the kernel of the host, wherein the second kernel module implements a second version that replaces the first version.

8. A non-transitory computer-readable storage medium that includes a set of instructions which, in response to execution by a processor of a host, cause the processor to perform a method to transfer runtime information between a first kernel module and a second kernel module, wherein the method comprises:
   assigning ownership of a memory pool at the host to the first kernel module implemented by the host;
   accessing, by the first kernel module, the memory pool to store runtime information associated with one or more operations performed by the first kernel module;
   releasing ownership of the memory pool from the first kernel module while maintaining the runtime information in the memory pool;
   assigning ownership of the memory pool to the second kernel module implemented by the host; and
   accessing, by the second kernel module, the memory pool to obtain the runtime information stored by the first kernel module.

9. The non-transitory computer-readable storage medium of claim 8, wherein releasing ownership of the memory pool comprises:
   in response to detecting, from the first kernel module, a request to release ownership of the memory pool, storing a memory pool name and a memory pool identifier associated with the memory pool.

10. The non-transitory computer-readable storage medium of claim 9, wherein assigning ownership of the memory pool to the second kernel module comprises:
    detecting, from the second kernel module, a request to acquire ownership of the memory pool based on the memory pool name; and
    sending, to second kernel module, a response specifying the memory pool identifier to allow the second kernel module to access the memory pool.

11. The non-transitory computer-readable storage medium of claim 9, wherein assigning ownership of the memory pool to the first kernel module comprises:
    detecting, from the first kernel module, a request to create the memory pool associated with the memory pool name and a pool size; and
    sending, to the first kernel module, a response specifying the memory pool identifier to allow the first kernel module to access the memory pool.

12. The non-transitory computer-readable storage medium of claim 9, wherein releasing ownership of the memory pool comprises:
    in response to determination that a period of time has elapsed since a release time associated with the memory pool, removing the memory pool name and the memory pool identifier associated with the memory pool.

13. The non-transitory computer-readable storage medium of claim 8, wherein the method further comprises:
    prior to assigning ownership of the memory pool to the second kernel module, unloading the first kernel module from a kernel of the host, wherein the first kernel module implements a first version of one or more operations.

14. The non-transitory computer-readable storage medium of claim 13, wherein the method further comprises:
    prior to assigning ownership of the memory pool to the second kernel module, loading the second kernel module into the kernel of the host, wherein the second kernel module implements a second version that replaces the first version.

15. A computer system that includes a host configured to transfer runtime information between a first kernel module and a second kernel module, wherein the computer system comprises:

a processor; and a non-transitory computer-readable medium having stored thereon instructions that, in response to execution by the processor, cause the processor to:
- assign ownership of a memory pool at the host to the first kernel module implemented by the host;
- access, by the first kernel module, the memory pool to store runtime information associated with one or more operations performed by the first kernel module;
- release ownership of the memory pool from the first kernel module while maintaining the runtime information in the memory pool;
- assign ownership of the memory pool to the second kernel module implemented by the host; and
- access, by the second kernel module, the memory pool to obtain the runtime information stored by the first kernel module.

16. The computer system of claim 15, wherein the instructions that cause the processor to release ownership of the memory pool cause the processor to:
- in response to detecting, from the first kernel module, a request to release ownership of the memory pool, store a memory pool name and a memory pool identifier associated with the memory pool.

17. The computer system of claim 16, wherein the instructions that cause the processor to assign ownership of the memory pool to the second kernel module cause the processor to:
- detect, from the second kernel module, a request to acquire ownership of the memory pool based on the memory pool name; and
- send, to second kernel module, a response specifying the memory pool identifier to allow the second kernel module to access the memory pool.

18. The computer system of claim 16, wherein the instructions that cause the processor to assign ownership of the memory pool to the first kernel module cause the processor to:
- detect, from the first kernel module, a request to create the memory pool associated with the memory pool name and a pool size; and
- send, to the first kernel module, a response specifying the memory pool identifier to allow the first kernel module to access the memory pool.

19. The computer system of claim 16, wherein the instructions that cause the processor to release ownership of the memory pool cause the processor to:
- in response to determination that a period of time has elapsed since a release time associated with the memory pool, remove the memory pool name and the memory pool identifier associated with the memory pool.

20. The computer system of claim 15, wherein the instructions further cause the processor to:
- prior to assigning ownership of the memory pool to the second kernel module, unload the first kernel module from a kernel of the host, wherein the first kernel module implements a first version of one or more operations.

21. The computer system of claim 20, wherein the instructions further cause the processor to:
- prior to assigning ownership of the memory pool to the second kernel module, load the second kernel module into the kernel of the host, wherein the second kernel module implements a second version that replaces the first version.

* * * * *